(12) United States Patent
Smith et al.

(10) Patent No.: US 7,241,034 B2
(45) Date of Patent: Jul. 10, 2007

(54) AUTOMATIC DIRECTIONAL CONTROL SYSTEM FOR VEHICLE HEADLIGHTS

(75) Inventors: James E. Smith, Berkey, OH (US); Anthony B. McDonald, Perrysburg, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/285,312

(22) Filed: Oct. 31, 2002

(65) Prior Publication Data

US 2003/0107898 A1 Jun. 12, 2003

Related U.S. Application Data

(60) Provisional application No. 60/369,447, filed on Apr. 2, 2002, provisional application No. 60/356,703, filed on Feb. 13, 2002, provisional application No. 60/335,409, filed on Oct. 31, 2001.

(51) Int. Cl.
*B60Q 1/00* (2006.01)
*B60R 22/00* (2006.01)

(52) U.S. Cl. .......................................... 362/465; 701/49

(58) Field of Classification Search .................. 362/37, 362/465–466; 315/82; 701/49
See application file for complete search history.

(56) References Cited

U.S. PATENT DOCUMENTS

| | | | |
|---|---|---|---|
| 3,634,677 A | 1/1972 | Stuttgart et al. | 362/467 |
| 3,939,339 A | 2/1976 | Alphen | 362/467 |
| 3,953,726 A | 4/1976 | Scarritt, Sr. | 362/465 |
| 4,024,388 A | 5/1977 | Skoff | 362/467 |
| 4,066,886 A | 1/1978 | Martin | 362/465 |
| 4,162,424 A | 7/1979 | Zillgitt et al. | 362/467 |
| 4,186,428 A | 1/1980 | Deverrewaere | 362/466 |
| 4,204,270 A | 5/1980 | d'Orsay | 362/466 |
| 4,217,631 A | 8/1980 | Bergkvist | 362/466 |
| 4,225,902 A | 9/1980 | Ishikawa et al. | 318/696 |
| 4,310,172 A | 1/1982 | Claude et al. | 362/466 |
| 4,549,277 A | 10/1985 | Brunson et al. | |
| 4,583,152 A | 4/1986 | Kawai et al. | 280/6.158 |
| 4,768,135 A | 8/1988 | Kretschmer et al. | 362/40 |

(Continued)

FOREIGN PATENT DOCUMENTS

EP 0306611 3/1989

(Continued)

*Primary Examiner*—Ali Alavi
(74) *Attorney, Agent, or Firm*—MacMillan, Sobanski & Todd, LLC (57) ABSTRACT

A structure and method for operating a directional control system for vehicle headlights that is capable of altering the directional aiming angles of the headlights to account for changes in the operating conditions of the vehicle. One or more operating condition sensors may be provided that generate signals that are representative of a condition of the vehicle, such as road speed, steering angle, pitch, suspension height, rate of change of road speed, rate of change of steering angle, rate of change of pitch, and rate of change of suspension height of the vehicle. A controller is responsive to the sensor signal for generating an output signal. An actuator is adapted to be connected to the headlight to effect movement thereof in accordance with the output signal. The controller can include a table that relates values of sensed operating condition to values of the output signal. The controller is responsive to the sensor signal for looking up the output signal in the table.

5 Claims, 7 Drawing Sheets

U.S. PATENT DOCUMENTS

| | | | |
|---|---|---|---|
| 4,791,343 A | 12/1988 | Ahrendt | 362/348 |
| 4,833,573 A | 5/1989 | Miyauchi et al. | 362/466 |
| 4,868,720 A | 9/1989 | Miyauchi et al. | 362/466 |
| 4,868,721 A | 9/1989 | Soardo | 362/466 |
| 4,870,545 A | 9/1989 | Hatanaka et al. | 315/82 |
| 4,891,559 A | 1/1990 | Matsumoto et al. | 356/121 |
| 4,907,877 A | 3/1990 | Fukuda et al. | 318/603 |
| 4,908,560 A | 3/1990 | Shibata et al. | 318/603 |
| 4,916,587 A | 4/1990 | Hirose et al. | 362/460 |
| 4,943,893 A | 7/1990 | Shibata et al. | 362/37 |
| 4,948,249 A | 8/1990 | Hopkins et al. | 356/121 |
| 5,060,120 A | 10/1991 | Kobayashi et al. | 362/465 |
| 5,099,400 A | 3/1992 | Lee | 362/37 |
| 5,158,352 A | 10/1992 | Ikegami et al. | 362/359 |
| 5,164,785 A | 11/1992 | Hopkins et al. | 356/121 |
| 5,181,429 A | 1/1993 | Sieber | 74/89.42 |
| 5,193,894 A | 3/1993 | Lietar et al. | 362/466 |
| 5,331,393 A | 7/1994 | Hopkins et al. | 356/121 |
| 5,373,357 A | 12/1994 | Hopkins et al. | 356/121 |
| 5,392,111 A | 2/1995 | Murata et al. | 356/121 |
| 5,404,278 A | 4/1995 | Shibata et al. | 362/464 |
| 5,426,571 A | 6/1995 | Jones | 362/466 |
| 5,428,512 A | 6/1995 | Mouzas | 362/466 |
| 5,485,265 A | 1/1996 | Hopkins | 356/121 |
| 5,526,242 A | 6/1996 | Takahashi et al. | 362/466 |
| 5,550,717 A | 8/1996 | Liao | 362/467 |
| 5,633,710 A | 5/1997 | Kumra | 362/464 |
| 5,660,454 A | 8/1997 | Mori et al. | |
| 5,707,129 A | 1/1998 | Kobayashi | 362/464 |
| 5,751,832 A | 5/1998 | Panter et al. | 362/104 |
| 5,779,342 A | 7/1998 | Kluge | 362/507 |
| 5,781,105 A | 7/1998 | Bitar et al. | 340/468 |
| 5,785,405 A | 7/1998 | Huhn | 362/459 |
| 5,868,488 A | 2/1999 | Speak et al. | 362/37 |
| 5,877,680 A | 3/1999 | Okuchi et al. | 340/468 |
| 5,896,011 A | 4/1999 | Zillgitt | 340/468 |
| 5,907,196 A | 5/1999 | Hayami et al. | 307/10.8 |
| 5,909,949 A * | 6/1999 | Gotoh | 362/37 |
| 5,920,386 A | 7/1999 | Panter et al. | 356/121 |
| 5,938,319 A | 8/1999 | Hege | 362/459 |
| 5,977,678 A | 11/1999 | Miller et al. | 310/103 |
| 6,010,237 A | 1/2000 | Gotou | 362/460 |
| 6,049,749 A * | 4/2000 | Kobayashi | 701/49 |
| 6,097,156 A | 8/2000 | Diep | 315/82 |
| 6,118,113 A | 9/2000 | Hibbard et al. | 250/205 |
| 6,142,655 A | 11/2000 | Zillgitt et al. | 362/466 |
| 6,144,159 A | 11/2000 | Lopez et al. | 315/82 |
| 6,176,590 B1 | 1/2001 | Prevost et al. | 362/37 |
| 6,183,118 B1 | 2/2001 | Toda et al. | 362/465 |
| 6,193,398 B1 * | 2/2001 | Okuchi et al. | 362/466 |
| 6,227,691 B1 | 5/2001 | Hogrefe et al. | 362/539 |
| 6,231,216 B1 | 5/2001 | Frasch | 362/464 |
| 6,234,654 B1 | 5/2001 | Okuchi et al. | 362/466 |
| 6,281,632 B1 | 8/2001 | Stam et al. | 315/82 |
| 6,293,686 B1 | 9/2001 | Hayami et al. | 362/465 |
| 6,305,823 B1 * | 10/2001 | Toda et al. | 362/276 |
| 2001/0019225 A1 | 9/2001 | Toda et al. | |

FOREIGN PATENT DOCUMENTS

| | | |
|---|---|---|
| EP | 1142757 | 10/2001 |
| EP | 1275555 | 1/2003 |
| GB | 2340925 | 3/2000 |

* cited by examiner

| SENSED CONDITION (STEERING ANGLE) VALUES | UP/DOWN ADJUSTMENT FACTORS | LEFT/RIGHT ADJUSTMENT FACTORS |
|---|---|---|
| +6° | -3.00° | +4.50° |
| +5° | -2.50° | +3.75° |
| +4° | -2.00° | +3.00° |
| +3° | -1.50° | +2.25° |
| +2° | -1.00° | +1.50° |
| +1° | -0.50° | +0.75° |
| 0° | 0.00° | 0.00° |
| -1° | -0.50° | -0.75° |
| -2° | -1.00° | -1.50° |
| -3° | -1.50° | -2.25° |
| -4° | -2.00° | -3.00° |
| -5° | -2.50° | -3.75° |
| -6° | -3.00° | -4.50° |

FIG. 7 though aimed to be representative of any # AUTOMATIC DIRECTIONAL CONTROL SYSTEM FOR VEHICLE HEADLIGHTS

CROSS REFERENCE TO RELATED APPLICATIONS

This application claims the benefit of U.S. Provisional Application Nos. 60/335,409, filed Oct. 31, 2001; 60/356,703, filed Feb. 13, 2002; and 60/369,447, filed Apr. 2, 2002, the disclosures of which are incorporated herein by reference.

BACKGROUND OF THE INVENTION

This invention relates in general to headlights that are provided on vehicles for illuminating dark road surfaces or other areas in the path of movement. In particular, this invention relates to an automatic directional control system for such vehicle headlights.

Virtually all land vehicles, and many other types of vehicles (such as boats and airplanes, for example), are provided with one or more headlights that are adapted to illuminate a portion of a dark road surface or other area in the path of movement of the vehicle to facilitate safe travel thereon. Typically, each headlight is mounted on or near the front end of the vehicle and is oriented in such a manner that a beam of light is projected forwardly therefrom. The angle at which the beam of light projects from the headlight can, for example, be characterized in a variety of ways, including (1) up and down relative to a horizontal reference position or plane and (2) left and right relative to a vertical reference position or plane. Such directional aiming angles are usually set at the time of assembly of the headlight into the vehicle so as to illuminate a predetermined portion of the road surface or other area in the path of movement of the vehicle.

In the past, these headlights have been mounted on the vehicle in fixed positions relative thereto such that the beams of light are projected therefrom at predetermined directional aiming angles relative to the vehicle. Although such fixed aiming angle headlight systems have and continue to function adequately, they cannot alter the directional aiming angles of the headlights to account for changes in the operating conditions of the vehicle. For example, if the speed of the vehicle is increased, it would be desirable to adjust the aiming angle of the headlights upwardly such that an area that is somewhat farther in front of the vehicle is more brightly illuminated. On the other hand, if the speed of the vehicle is decreased, it would be desirable to adjust the aiming angle of the headlights downwardly such that an area that is somewhat closer in front of the vehicle is more brightly illuminated. Similarly, if the vehicle turns a corner, it would be desirable to adjust the aiming angle of the headlights either toward the left or toward the right (depending on the direction of the turn) such that an area that is somewhat lateral to the front of the vehicle is more brightly illuminated.

To accomplish this, it is known to provide a directional control system for vehicle headlights that is capable of automatically altering the directional aiming angles of the headlights to account for changes in the operating conditions of the vehicle. A variety of such automatic directional control systems for vehicle headlights are known in the art. However, such known automatic headlight directional control systems have been found to be deficient for various reasons. Thus, it would be desirable to provide an improved structure for an automatic headlight directional control system that addresses such deficiencies.

SUMMARY OF THE INVENTION

This invention relates to an improved structure and method for operating a directional control system for vehicle headlights that is capable of automatically altering the directional aiming angles of the headlights to account for changes in the operating conditions of the vehicle. One or more operating condition sensors may be provided that generate signals that are representative of an operating condition of the vehicle, such as road speed, steering angle, pitch, suspension height, rate of change of road speed, rate of change of steering angle, rate of change of pitch, and rate of change of suspension height of the vehicle. A controller is responsive to the sensor signal for generating an output signal. An actuator is adapted to be connected to the headlight to effect movement thereof in accordance with the output signal. The controller can include a table that relates values of sensed operating condition to values of the output signal. The controller is responsive to the sensor signal for looking up the output signal in the table.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
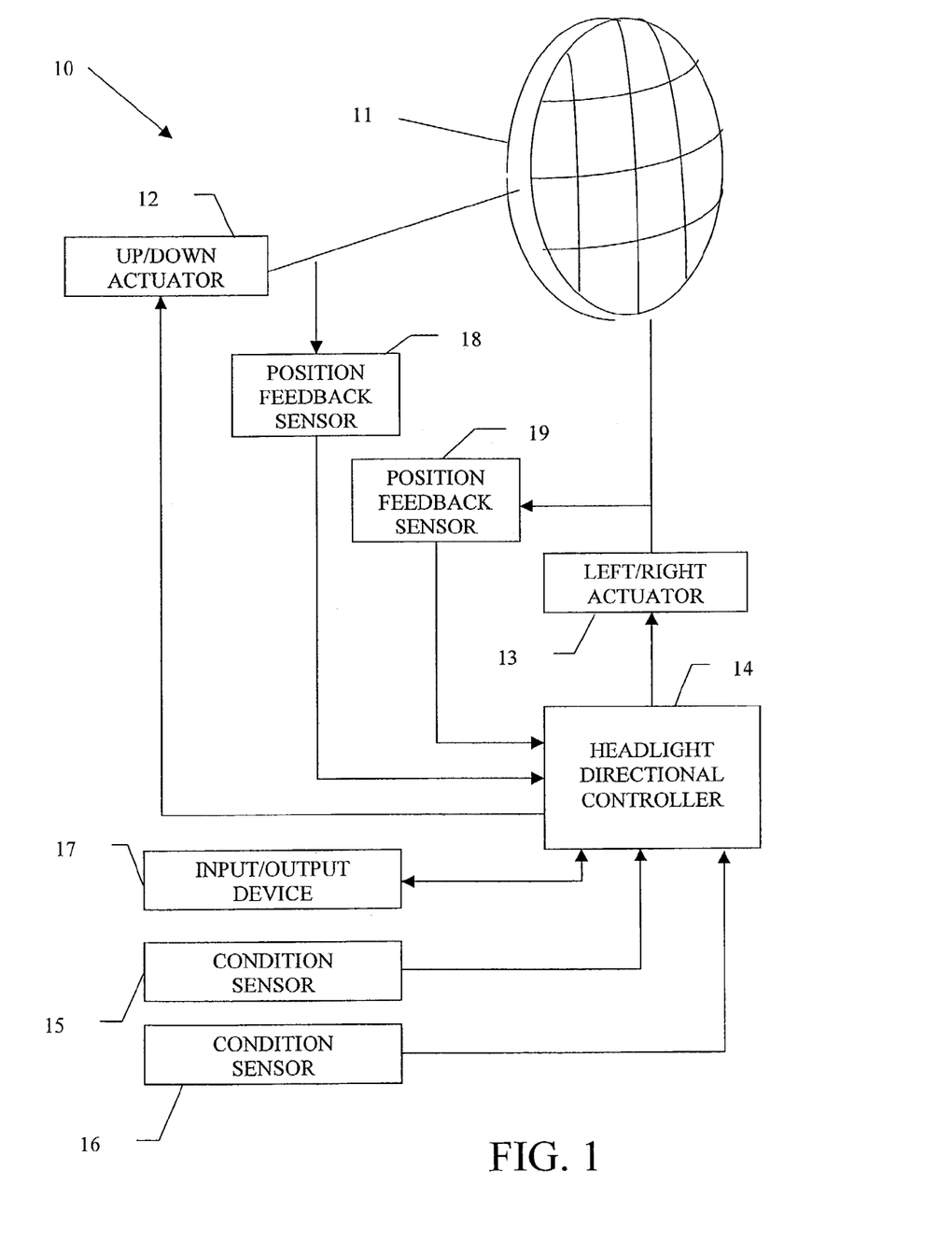
FIG. 1 is a block diagram of an automatic directional control system for a vehicle headlight in accordance with this invention.

Referring now to the drawings, there is illustrated in FIG. 1 an automatic directional control system, indicated generally at 10, for a vehicle headlight 11 in accordance with this invention. The illustrated headlight 11 is, of itself, conventional in the art and is intended to be representative of any device that can be supported on any type of vehicle for the purpose of illuminating any area, such as an area in the path of movement of the vehicle. The headlight 11 is typically mounted on or near the front end of a vehicle (not shown) and is oriented in such a manner that a beam of light is projected therefrom. In a manner that is well known in the art, the headlight 11 is adapted to illuminate a portion of a dark road surface or other area in the path of movement of the vehicle to facilitate safe travel thereon.

The headlight 11 is adjustably mounted on the vehicle such that the directional orientation at which the beam of light projects therefrom can be adjusted relative to the vehicle. Any desired mounting structure can be provided to accomplish this. Typically, the headlight 11 is mounted on the vehicle such that the angle at which the beam of light projects therefrom can be adjusted both (1) up and down relative to a horizontal reference position or plane and (2) left and right relative to a vertical reference position or plane. Although this invention will be described and illustrated in the context of a headlight that is adjustable in both the up/down direction and the left/right direction, it will be appreciated that this invention may be practiced with any headlight 11 that is adjustable in any single direction or multiple directions of movement, whether up/down, left/right, or any other direction.

To effect movement of the illustrated headlight 11 relative to the vehicle, an up/down actuator 12 and a left/right actuator 13 are provided. The actuators 12 and 13 are conventional in the art and may, for example, be embodied as servo motors, step motors, or any other electronically controlled mechanical actuators. It has been found to be desirable to use microstepping motors for the actuators 12 and 13. Such microstepping motors are known in the art and consist of conventional step motors that have appropriate hardware (i.e., driver integrated circuits) and software that allow the step motors to be operated in fractional step increments. The use of such microstepping motors has been found to be desirable because they can effect movements of the headlights in a somewhat faster, smoother, and quieter manner than conventional step motors, and further permit more precise positioning of the headlights 11. In the illustrated embodiment, the up/down actuator 12 is mechanically connected to the headlight 11 such that the headlight 11 can be selectively adjusted up and down relative to a horizontal reference position or plane. Similarly, the illustrated left/right actuator 13 is mechanically connected to the headlight 11 such that the headlight 11 can be selectively adjusted left and right relative to a vertical reference position or plane.

A headlight directional controller 14 is provided for controlling the operations of the up/down actuator 12 and the left/right actuator 13 and, therefore, the angle at which the beam of light projects from the headlight 11 relative to the vehicle. The headlight directional controller 14 can be embodied as any control system, such as a microprocessor or programmable electronic controller, that is responsive to one or more sensed operating conditions of the vehicle for selectively operating the up/down actuator 12 and the left/right actuator 13. To accomplish this, the automatic directional control system 10 can include, for example, a pair of condition sensors 15 and 16 that are connected to the headlight directional controller 14. The condition sensors 15 and 16 are conventional in the art and are responsive to respective sensed operating conditions of the vehicle for generating electrical signals to the headlight directional controller 14. However, if desired, only a single one of the condition sensors 15 and 16 need be provided. Alternatively, additional condition sensors (not shown) may be provided if desired to generate electrical signals that are representative of any other operating conditions of the vehicle. A conventional input/output device 17 is connected to (or can be connected to) the headlight directional controller 14 for facilitating communication therewith in the manner described below.

If desired, a first position feedback sensor 18 may be provided for the up/down actuator 12, and a second position feedback sensor 19 may be provided for the left/right actuator 13. The position feedback sensors 18 and 19 are conventional in the art and are adapted to generate respective electrical signals that are representative of the actual up/down and left/right positions of the headlight 11. Thus, the first position feedback sensor 18 is responsive to the actual up/down position of the headlight 11 (as determined by a portion of the up/down actuator 12, for example) for generating an electrical signal to the headlight directional controller 14 that is representative thereof. Similarly, the second position feedback sensor 19 is responsive to the actual left/right position of the headlight 11 (as determined by a portion of the left/right actuator 13, for example) for generating an electrical signal to the headlight directional controller 14 that is representative thereof. The position feedback sensors 18 and 19 can be embodied as any conventional sensor structures, such as Hall effect sensors, that are responsive to movements of the headlight 11 (or to the movements of the respective actuators 12 and 13 that are connected to move the headlight 11) for generating such signals.

Alternatively, the position feedback sensors 18 and 19 can be embodied as respective devices that generate electrical signals whenever the headlight 11 has achieved respective predetermined up/down or left/right positions. This can be accomplished, for example, using a conventional optical interrupter (not shown) for each of the actuators 12 and 13. Each of the optical interrupters includes a flag or other component that is mounted on or connected to the headlight 11 for movement therewith. Each of the optical interrupters further includes an optical source and sensor assembly. As the headlight 11 is moved by the actuators 12 and 13, the flag moves therewith relative to the optical source and sensor assembly between a first position, wherein the flag permits light emitted from the source from reaching the sensor, and a second position, wherein the flag prevents light emitted from the source from reaching the sensor. When the flag is in the first position relative to the optical source and sensor assembly, the sensor is permitted to receive light emitted from the source. As a result, a first signal is generated from the optical source and sensor assembly to the headlight directional controller 14. Conversely, when the flag is in the second position relative to the optical source and sensor assembly, the sensor is not permitted to receive light emitted from the source. As a result, a second signal is generated from the optical source and sensor assembly to the headlight directional controller 14. Thus, the edge of the flag defines a transition between the first and second positions of the flag relative to the optical source and sensor assembly and, therefore, defines a predetermined up/down or left/right position of the headlight 11. The nature of the signal generated from the optical source and sensor assembly to the headlight directional controller 14 (i.e., the first signal or the second signal) can also be used to determine on which side of the predetermined position (the left side or the right side, for example) that the headlight 11 is positioned. The purpose for such position feedback sensors 18 and 19 will be discussed below.

Figure 2:
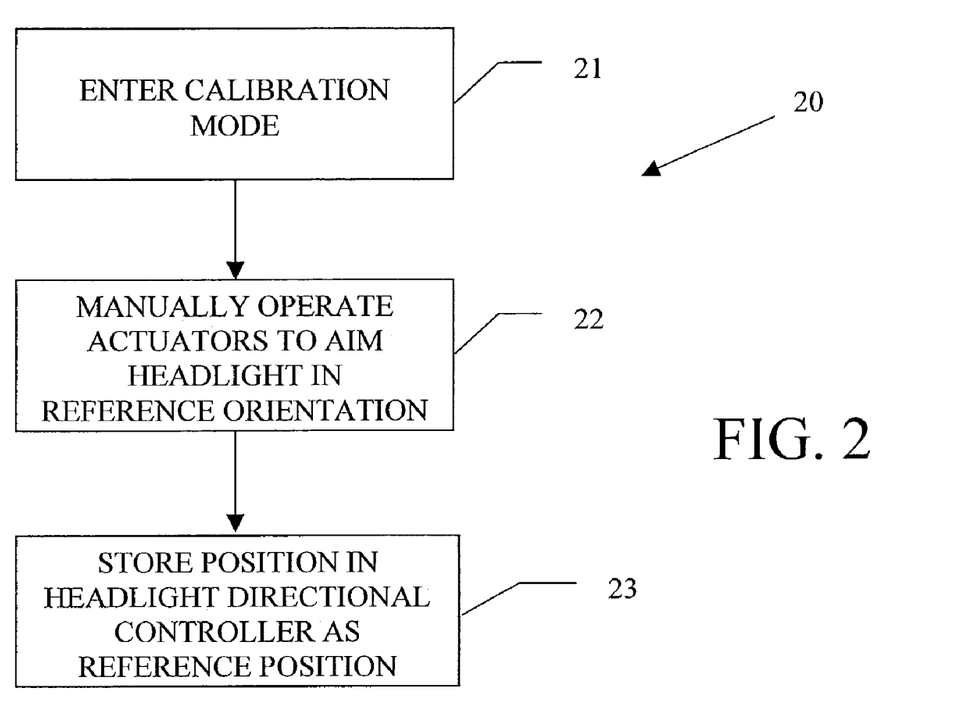
FIG. 2 is a flow chart of an algorithm for calibrating the automatic directional control system illustrated in FIG. 1 so as to define an initial reference position for the headlight from which the headlight directional controller can implement directional angle adjustments.

FIG. 2 is a flow chart of an algorithm, indicated generally at 20, for calibrating the automatic directional control system illustrated in FIG. 1 so as to define an initial reference position or positions for the headlight 11 from which the headlight directional controller 14 can implement directional angle adjustments. As mentioned above, the headlight 11 is mounted on the vehicle such that the angle at which the beam of light projects therefrom can be adjusted both up and down relative to a horizontal reference position or plane and left and right relative to a vertical reference position or plane. To insure accurate positioning of the headlight 11, it is desirable that a reference position or positions be initially established by the headlight directional controller 14. Subsequent directional angle adjustments can be made by the headlight directional controller 14 from the pre-established reference position or positions established by this calibration algorithm 20.

To accomplish this, the calibration algorithm 20 has a first step 21 wherein the headlight directional controller 14 is caused to enter a calibration mode of operation. In the calibration mode of operation, the headlight directional controller 14 is responsive to input signals from the input/output device 17 (or from another source, if desired) for causing manual operation of the up/down actuator 12 and the left/right actuator 13. Thus, while the headlight directional controller 14 is in the calibration mode of operation, an operator of the input/output device 17 can manually effect either up/down movement of the headlight 11, left/right movement of the headlight 11, or both, as desired.

In a second step 22 of the calibration algorithm 20, the up/down actuator 12 and the left/right actuator 13 are manually operated to aim the headlight 11 in a predetermined reference orientation. This can be accomplished by use of the input/output device 17 that, as mentioned above, is connected to (or can be connected to) the headlight directional controller 14. Traditionally, the aiming of a headlight 11 has been accomplished by parking the vehicle on a surface near a wall or other vertical structure, providing a reference target at a predetermined location on the wall or other structure, and mechanically adjusting the mounting structure of the headlight 11 such that the center of the beam therefrom is projected at the reference target. In this invention, the vehicle is parked on a surface near a wall or other vertical structure, and a reference target is provided at a predetermined location on the wall or other structure, as described above. Next, in accordance with the second step 22 of this calibration algorithm 20, the input/output device 17 is operated to generate electrical signals to the headlight directional controller 14. In response to such electrical signals, the headlight directional controller 14 operates the up/down actuator 12 and the left/right actuator 13 to move the headlight 11 such that center of the beam projecting therefrom is aimed at the reference target. When the beam from the headlight 11 is so aimed, then the headlight 11 is determined to be oriented in the initial reference position from which the headlight directional controller 14 can subsequently implement directional angle adjustments.

In a third step 23 of the calibration algorithm 20, once this initial reference position for the headlight 11 has been achieved, such position is stored in the headlight directional controller 14 as the predetermined initial reference position. This can be accomplished by means of the position feedback sensors 18 and 19. As discussed above, the position feedback sensors 18 and 19 are adapted to generate respective electrical signals that are representative of the actual up/down and left/right positions of the headlight 11 or of the predetermined positions for the headlight. Thus, the first position feedback sensor 18 is responsive to the actual up/down position of the headlight 11 (as determined by the up/down actuator 12, for example) for generating an electrical signal to the headlight directional controller 14 that is representative thereof. Similarly, the second position feedback sensor 19 is responsive to the actual left/right position of the headlight 11 (as determined by the left/right actuator 13, for example) for generating an electrical signal to the headlight directional controller 14 that is representative thereof. Accordingly, the third step 23 of the calibration algorithm 20 can be performed by causing the headlight directional controller 14 to read the signals from the position feedback sensors 18 and 19 and store the current up/down and left/right positions of the headlight 11 as the initial reference positions from which the headlight directional controller 14 can subsequently implement directional angle adjustments.

The current position of the headlight 11 is preferably stored in the non-volatile memory of the headlight directional controller 14 for reference during normal operation of the automatic directional control system 10 described below. Thus, when the automatic directional control system 10 is initially activated (such as when the electrical system of the vehicle is initially turned on), the headlight directional controller 14 can position the headlight 11 at or near the calibrated position utilizing the signals comparing the current position of the headlight 11 (as determined by the signals generated by the position feedback sensors 18 and 19) with the predetermined reference position determined by the calibration algorithm 20.

Figure 3:
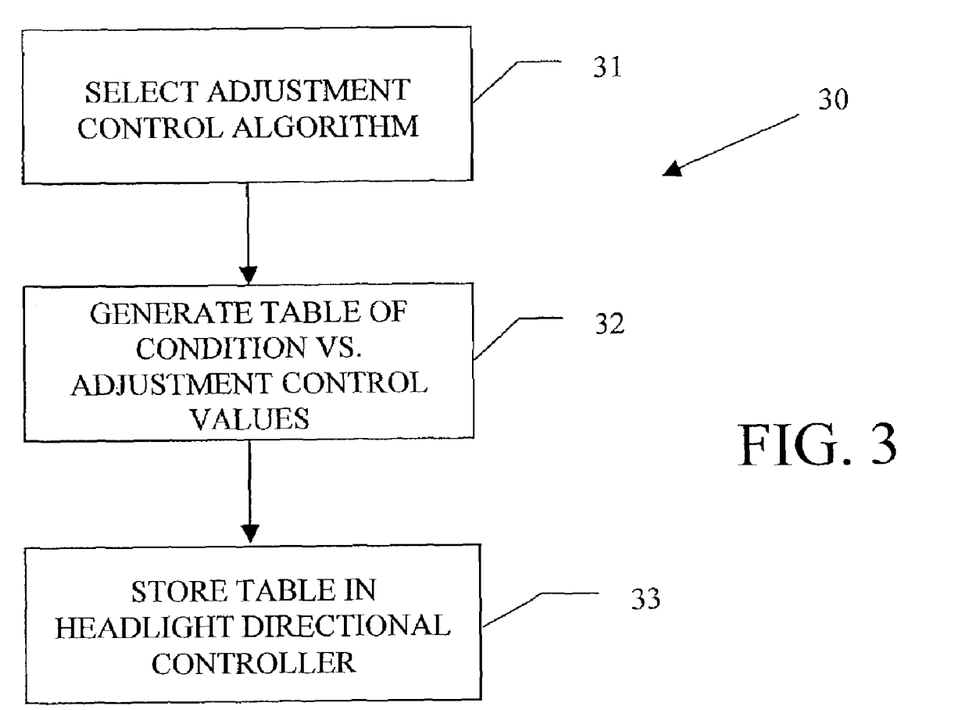
FIG. 3 is a flow chart of an algorithm for generating a table that relates one or more sensed vehicle operating condition values to one or more headlight directional angle adjustment factors and for storing such table in the headlight directional controller illustrated in FIG. 1.
Figure 4:
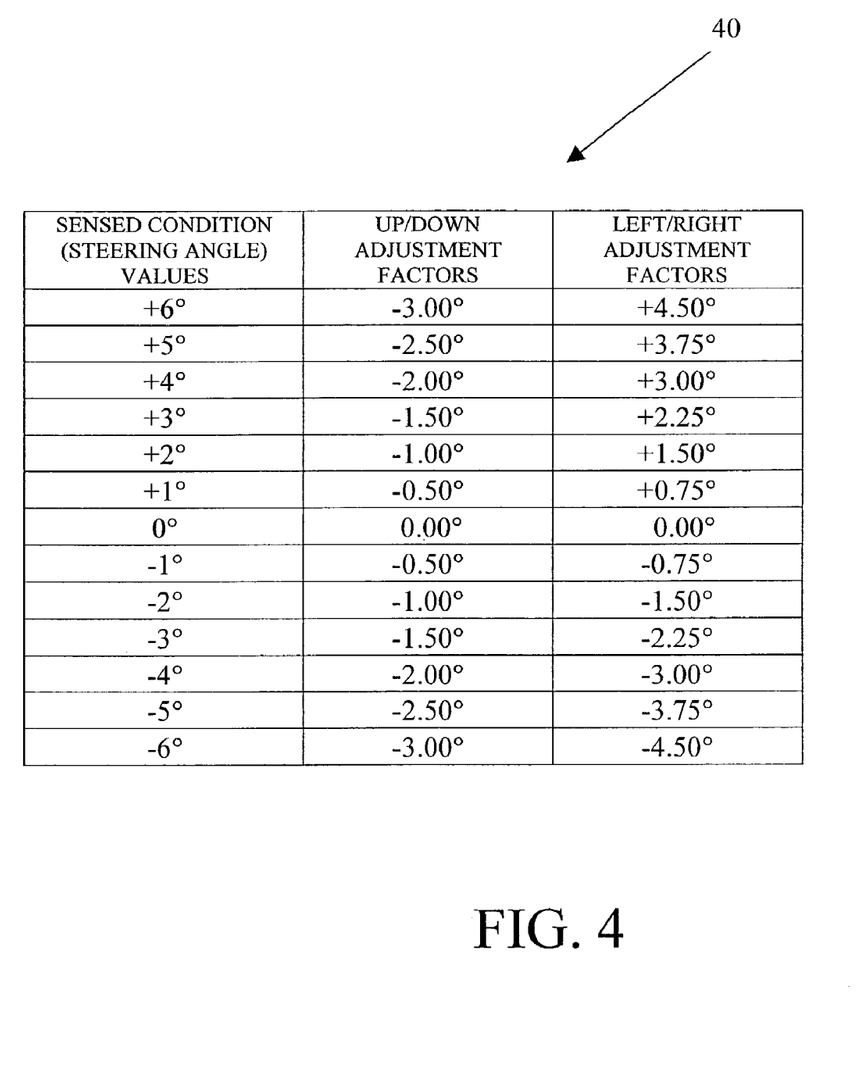
FIG. 4 is an example of a table that can be generated and stored in the headlight directional controller in accordance with the table generating algorithm illustrated in FIG. 3.

FIG. 3 is a flow chart of an algorithm, indicated generally at 30, for generating a table that relates the sensed condition values from the condition sensors 15 and 16 to the headlight directional angle adjustment factors that will be implemented by the headlight directional controller 14, and further for storing such table in the headlight directional controller 14 illustrated in FIG. 1. As used herein, the term "table" is intended to be representative of any collection or association of data that relates one or more of the sensed condition values to one or more of the headlight directional angle adjustment factors. The table of data can be generated, stored, and expressed in any desired format. For example, this table of data can be generated, stored, and expressed in a conventional spreadsheet format, such as shown in FIG. 4, which will be discussed in detail below.

In a first step 31 of the table generating algorithm 30, an adjustment control algorithm is selected. The adjustment control algorithm can be, generally speaking, any desired relationship that relates one or more operating conditions of the vehicle to one or more angular orientations of the headlight 11. A variety of such relationships are known in the art, and this invention is not intended to be limited to any particular relationship. Typically, such relationships will be expressed in terms of a mathematical equation or similar relationship that can be readily processed using a microprocessor or similar electronic computing apparatus, such as the above-described headlight directional controller 14. The particular adjustment control algorithm that is selected may, if desired, vary from vehicle to vehicle in accordance with a variety of factors, including relative size and performance characteristics of the vehicle or any other desired condition.

As mentioned above, a plurality of operating conditions may be sensed by the condition sensors 15 and 16 and provided to the headlight directional controller 14 for use with the adjustment control mechanism. For example, the condition sensors 15 and 16 may generate electrical signals to the headlight directional controller 14 that are representative of the road speed, the steering angle, and the pitch of the vehicle (which can, for example, be determined by sensing the front and rear suspension heights of the vehicle or by a pitch or level sensor). Additionally, the time derivative of these operating conditions (i.e., the rate of change of the road speed, steering angle, and pitch of the vehicle) can be sensed or calculated. However, any other operating condition or conditions of the vehicle may be sensed and provided to the headlight directional controller 14.

In a second step 32 of the table generating algorithm 30, the table is generated using the adjustment control algorithm selected in the first step 31. The table can be generated in any desired manner. For example, let it be assumed that the selected adjustment control algorithm relates a single sensed operating condition to each of the angular adjustment control values for adjusting both the up/down orientation and the left/right orientation of the headlight 11. The table can be generated by initially selecting a first discrete sensed operating condition value that might be encountered during operation of the vehicle. Then, the selected adjustment control algorithm is solved using such first discrete sensed operating condition value to obtain the corresponding adjustment control values for the up/down and left/right orientation of the headlight 11. Then, the first discrete sensed operating condition value and the corresponding adjustment control values are stored in the table. This process can be repeated for any desired number of other discrete sensed operating condition values that might be encountered during operation of the vehicle.

As mentioned above, FIG. 4 is a representative example of a table, indicated generally at 40, that can be generated in accordance with the second step 32 of the table generating algorithm 30 illustrated in FIG. 3. As shown therein, a series of discrete sensed operating condition values (degrees of steering angles, for example) is related to the angular adjustment control values (degrees of movement from the associated up/down and left/right reference positions or planes, for example) for adjusting both the up/down orientation and the left/right orientation of the headlight 11. For the purposes of illustration only, let it be assumed that (1) a positive steering angle value represents steering toward left, while a negative steering angle value represents steering toward the right, (2) a positive up/down adjustment factor represents aiming the headlight 11 upwardly, while a negative up/down adjustment factor represents aiming the headlight 11 downwardly, and (3) a positive left/right adjustment factor represents aiming the headlight 11 toward the left, while a negative left/right adjustment factor represents aiming the headlight 11 toward the right.

Thus, in accordance with the selected adjustment control algorithm, a sensed steering angle of +6° results in an up/down adjustment factor of −3.00° and a left/right adjustment factor of +4.50°. Similarly, a sensed steering angle of +5° results in an up/down adjustment factor of −2.50° and a left/right adjustment factor of +3.75°, and so on as shown in the table 40. The illustrated table 40 relates thirteen different sensed steering angle values to their corresponding adjustment control values for both the up/down and left/right orientation of the headlight 11. However, the table 40 can include a greater or lesser number of such sensed operating condition values, together with their corresponding adjustment control values. Furthermore, although the illustrated table 40 relates only a single sensed operating condition value (steering angle) to the corresponding adjustment control values for both the up/down and left/right orientation of the headlight 11, the selected adjustment control algorithm may, as mentioned above, be responsive to a plurality of sensed operating condition values for determining the corresponding adjustment control values. Alternatively, as will be discussed further below, a plurality of tables 40 can be generated, one for each of the plurality of sensed operating condition values. The size and extent of the table 40 or tables can be varied to accommodate any desired number of such sensed operating conditions.

Referring back to FIG. 3, in a third step 33 of the table generating algorithm 30, the table 40 generated in the second step 32 is stored in the memory of the headlight directional controller 14 illustrated in FIG. 1. The contents of the table 40 can be communicated serially to the headlight directional controller 14 by means of the input/output device 17 illustrated in FIG. 1 or in any other desired manner. Regardless of how it is communicated, the table 40 is preferably stored in a non-volatile memory of the headlight directional controller 14 for subsequent use in the manner described further below when the vehicle is operated.

As mentioned above, it may be desirable to vary the algorithm that is selected for use in implementing the headlight directional angle adjustment factors. The generation of the table 40 and the storage of such table 40 in the memory of the headlight directional controller 14 allow a designer of the automatic directional control system 10 to quickly and easily alter the response characteristics of the system 10 as desired, without the need for direct access to the computer code or software that is used to operate the headlight directional controller 14. Rather, to effect such alterations, a designer can simply change some or all of the data points that are contained within the table 40. As will be described in detail below, the headlight directional controller 14 will use whatever data points that are contained within the table 40 in determining the need for adjustments in the angular orientation of the headlight 11. This structure also reduces the amount of processing power that is necessary for the headlight directional controller 14 because it can operate on a relatively simple look-up basis using the table 40, rather than having to calculate relatively high order equations that may be used to determine the data points contained within the table 40.

Figure 5:
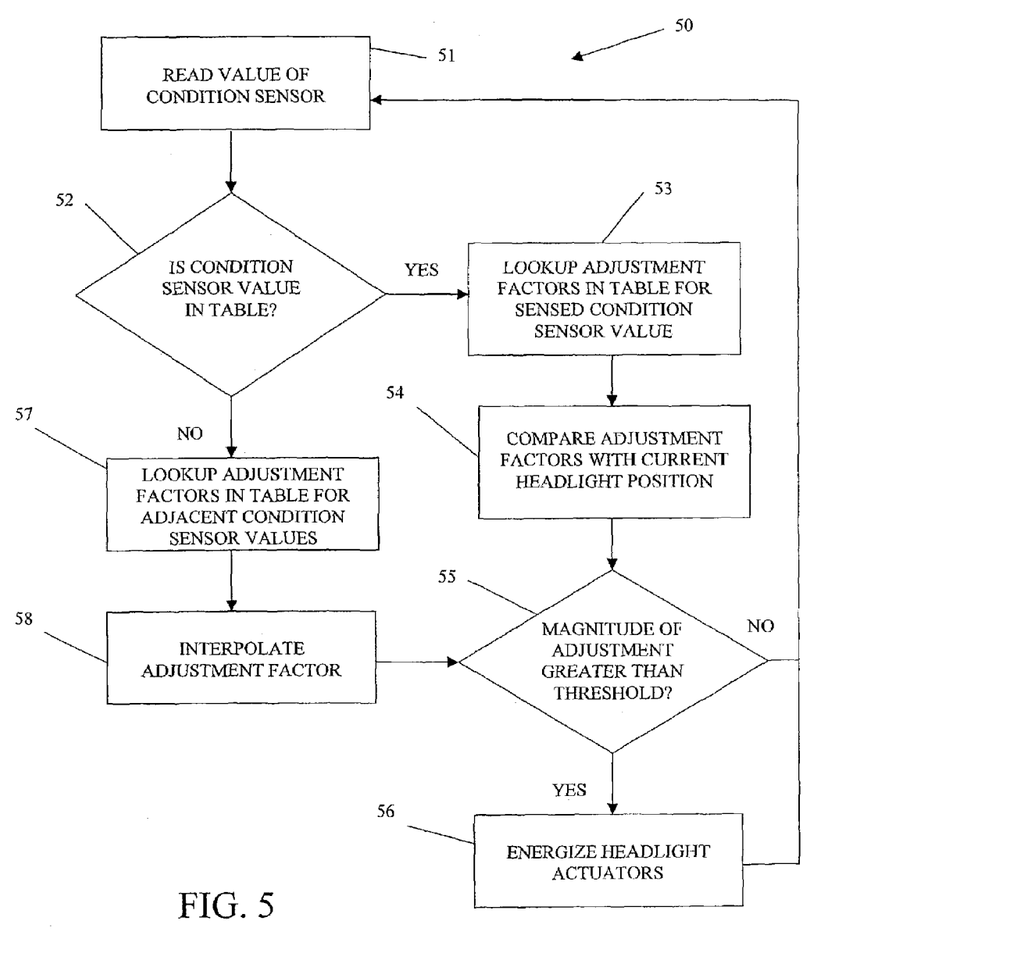
FIG. 5 is a flow chart of an algorithm for operating the headlight directional controller illustrated in FIG. 1 to automatically implement directional angle adjustments in accordance with sensed condition values.

FIG. 5 is a flow chart of an algorithm, indicated generally at 50, for operating the headlight directional controller illustrated in FIG. 1 to automatically implement directional angle adjustments in accordance with one or more of the sensed condition values from the condition sensors 15 and 16. In a first step 51 of the operating algorithm 50, the values of one or more of the condition sensors 15 and 16 are read by the headlight directional controller 14. Then, the operating algorithm 50 enters a decision point 52, wherein it is determined whether the value or values of the condition sensors 15 and 16 that have been read by the headlight directional controller 14 are specifically contained in the table 40. For example, using the table 40 illustrated in FIG. 4, if the headlight directional controller 14 has read a steering angle value of −2°, then it is determined that the value of the condition sensor 15 is specifically contained within the table 40. In this instance, the operating algorithm 50 branches from the decision point 52 to an instruction 53, wherein the adjustment factors contained in the table 40 that correspond to the sensed condition value are looked up and stored in the headlight directional controller 14.

The operating algorithm 50 next enters an instruction 54 wherein the value of the magnitude of the adjustment factor (i.e., the desired position for the headlight 11) is compared with the current position of the headlight 11. This step 54 of the operating algorithm 50 is optional and can be performed if one or more of the position feedback sensors 18 and 19 are provided in the automatic directional control system 10 to generate respective electrical signals that are representative of the actual up/down and left/right positions of the headlight 11, as described above. This step 54 of the operating algorithm 50 can be performed to determine how much of an adjustment is necessary to move the headlight 11 from its current position, as determined by the position feedback sensors 18 and 19, to the desired position, as defined by the adjustment factor obtained from the table 40. To accomplish this, the value of the adjustment factor may, for example, be subtracted from the current position of the headlight 11 to determine the magnitude of the difference therebetween and, therefore, the magnitude of the adjustment that is necessary to move the headlight 11 from its current position to the desired position. However, this step 54 of the operating algorithm 50 can be accomplished in any other desired manner.

Next, the operating algorithm 50 enters a decision point 55, wherein it is determined whether the magnitude of the adjustment that is necessary to move the headlight 11 from its current position to the desired position is greater than a predetermined minimum threshold. This step in the operating algorithm 50 is also optional, but may be desirable to prevent the actuators 12 and 13 from being operated continuously or unduly frequently in response to relatively small variations in the sensed operating condition or conditions, such as relatively small bumps in the road. For example, if the current position of the headlight 11 is relatively close to the desired position, then it may be undesirable to effect any movement thereof. This step 55 will prevent the actuators 12 and 13 from being operated unless the current position of the headlight 11 is relatively far from the desired position. As another example, if the condition sensors 15 and 16 are respectively responsive to the front and rear suspension heights of the vehicle for the purpose of determining the pitch thereof, then the headlight directional controller 14 may be programmed to be responsive only to changes in the suspension heights that occur at frequencies that are lower than the suspension rebound frequency of the vehicle (thereby ignoring relatively high frequency changes in suspension height that are likely the result of bumps in the road). However, relatively high frequency changes in the suspension heights could also be monitored to assist in deciphering relatively rough suspension changes from other suspension changes.

In any event, the provision of the predetermined minimum threshold functions as a filter or dead band that minimizes or eliminates undesirable "hunting" of the actuators 12 and 13 for relatively small magnitudes of movement of the headlight 11. If the magnitude of the adjustment factor is not greater than the predetermined minimum threshold, then the operation of the actuators 12 and 13 is considered to be undesirable. Thus, the operating algorithm 50 branches from the decision point 55 back to the instruction 51, wherein the above-described steps of the operating algorithm 50 are repeated.

If, on the other hand, the magnitude of the adjustment factor is greater than the predetermined minimum threshold, then the operation of the actuators 12 and 13 is considered to be desirable. Thus, the operating algorithm 50 branches from the decision point 55 to an instruction 56, wherein either or both of the actuators 12 and 13 are actuated to effect movement of the headlight 11. For example, using the table 40 illustrated in FIG. 4, if the headlight directional controller 14 has read a steering angle value of −2°, then the headlight directional controller 14 will look up an up/down adjustment factor of −1.00° and a left/right adjustment factor of −1.50° from the table 40. The headlight directional controller 14 operates the actuators 12 and 13 to adjust the angular orientation of the headlight 11 to achieve the noted adjustment factors.

In some instances, the amounts of movement that are to be implemented by the two actuators 12 and 13 will be the same (i.e., the amount of up/down movement of the headlight 11 will be the same as the amount of left/right movement). More frequently, however, the amounts of movement that are to be implemented by the two actuators 12 and 13 will be different from one another. In the latter instances, it may be desirable to operate the two actuators 12 and 13 at two different speeds such that the overall movement of the headlight 11 is relatively uniform. For example, if the amount of movement that is to be implemented by the up/down actuator 12 is twice as large as the amount of movement that is to be implemented by the left/right actuator 13, then it may be desirable to operate the up/down actuator 12 at one-half of the speed of the left/right actuator 13 so that the movements of both actuators 12 and 13 (and, therefore, the overall movement of the headlight 11) will start and stop at approximately the same time. Similarly, if the vehicle is provided with two different headlights 11, as is commonly found, then it may be desirable to control the respective movements of such different headlights 11 in such a manner that they both start and stop at approximately the same time. This can be accomplished, for example, by providing a single headlight directional controller 14 for not only controlling, but also coordinating the movements of both of the headlights 11 in response to the sensed operating conditions.

Such operations can be performed in an open loop manner if desired, wherein the actuators 12 and 13 are operated to achieve predetermined amounts of movement. For example, the actuators 12 and 13 can be embodied as step motors that are operated a predetermined number of steps to achieve predetermined amounts of movement. Alternatively, the actuators 12 and 13 can be operated for predetermined periods of time to achieve the predetermined amounts of movement. However, more desirably, the operations of the actuators 12 and 13 are performed in a closed loop manner. To accomplish this, the actuators 12 and 13 are operated until either or both of the position feedback sensors 18 and 19 generate signals indicate that the headlight 11 has actually achieved the predetermined amounts of movement or desired position. In either event, the operating algorithm 50 then branches back to the instruction 51, wherein the above-described steps of the algorithm 50 are repeated.

Referring back to the decision point 52, if the value or values of the condition sensors 15 and 16 that have been read by the headlight directional controller 14 are not specifically contained in the table 40, then the operating algorithm 50 branches from the decision point 52 to an instruction 57, wherein the adjustment factors that are specifically contained in the table 40 that correspond to the adjacent sensed condition values are looked up and stored in the headlight directional controller 14. For example, using the table 40 illustrated in FIG. 4, if the headlight directional controller 14 has read a steering angle value of −1.5°, then it is determined that the value of the condition sensor 15 is not specifically contained within the table 40. Rather than simply default to the closest value that is contained within the table 40, the two adjustment factors specifically contained in the table 40 that are adjacent to the sensed condition value (namely, the adjustment factors for the steering angle values of −1° and −2°) are looked up and stored in the headlight directional controller 14.

The operating algorithm 50 next enters an instruction 58, wherein the actual adjustment factors to be implemented by the headlight directional controller 14 are interpolated or otherwise calculated from the stored adjustment factors that are adjacent to the sensed condition value. For example, as mentioned above, if the actual sensed steering angle value is −1.5°, then the headlight directional controller 14 looks up the adjustment factors for the steering angle values of −1° and −2°. The up/down adjustment factor for a steering angle value of −1° is −0.50 while the up/down adjustment factor for a steering angle value of −2° is −1.00°. If the calculation that is performed by the headlight directional controller 14 is a simple arithmetic mean, then the interpolated up/down adjustment factor would be −0.75°. Similarly, the left/right adjustment factor for a steering angle value of −1° is −0.75°, while the left/right adjustment factor for a steering angle value of −2° is −1.50°. If the calculation that is performed by the headlight directional controller 14 is a simple arithmetic mean, then the interpolated left/right adjustment factor would be −1.13°. Thereafter, the operating algorithm 50 branches to the decision point 55, and the remainder of the operating algorithm 50 is performed as described above.

The interpolation that is performed by the headlight directional controller 14 can be accomplished in any desired manner. The performance of the simple arithmetic mean described above is intended to be representative of any mathematical or other function that can be performed to calculate, derive, or otherwise obtain adjustment factors that are not present in the table 40. Furthermore, although this interpolation has been described in the context of using only the two condition values that are directly adjacent to the actual sensed condition value, it will be appreciated that the adjustment values for any single condition value or combination of sensed condition values may be selected for the interpolation. For example, several of the condition values both above and below the sensed condition value can be read from the table 40 to derive a trend line or other good estimate of the adjustment factors that are not present in the table 40. Performance of this interpolation does not require any significant increase in the amount of processing power that is necessary for the headlight directional controller 14.

The above discussion has assumed the use of a single table 40 that provides adjustment values based upon a single sensed operating condition (steering angle of the vehicle, in the illustrated embodiment). However, as discussed above, this invention may be practiced by sensing a plurality of operating conditions of the vehicle. For example, let it be assumed that both steering angle and vehicle road speed are sensed by the condition sensors 15 and 16. As previously discussed, the adjustment control algorithm that is selected in the first step 31 of the table generating algorithm 30 can be designed to accommodate multiple sensed conditions. Alternatively, however, a first table (such as the table 40 illustrated in FIG. 4) may be generated that relates the steering angle of the vehicle to the angular adjustment control values for adjusting both the up/down orientation and the left/right orientation of the headlight 11. A second, similar table (not shown) may also be generated that relates the road speed of the vehicle to the angular adjustment control values for adjusting both the up/down orientation and the left/right orientation of the headlight 11. Thus, for a given steering angle and road speed of the vehicle, the first and second tables may provide differing angular adjustment control values. To address this, the interpolation step 57 of the operating algorithm 50 can be performed to interpolate a single composite adjustment value that is based upon the two different values provided in the first and second tables for the pair of sensed operating conditions. This interpolation can be performed in the same manner as described above for each of the actuators 12 and 13.

A variety of control strategies can be implemented using the automatic directional control system 10 described above. For example, the pitch of the vehicle can change as a result of a variety of factors, including acceleration, deceleration, and weight distribution of the vehicle. These pitch variations can alter the angle at which the beam of light projects from the headlight 11 in the up and down direction relative to a horizontal reference position or plane. The automatic directional control system 10 can be responsive to such pitch variations for operating the up/down actuator 12 to maintain the angle at which the beam of light projects from the headlight 11 in the up and down direction relatively constant to the horizontal reference position or plane.

As discussed above, the angle at which the beam of light projects from the headlight 11 in the left and right direction relative to a vertical reference position or plane can be adjusted in accordance with the sensed steering angle. However, the angle at which the beam of light projects from the headlight 11 in the up and down direction relative to a horizontal reference position or plane can also be adjusted in accordance with the sensed steering angle. This can be done to lower the headlight beams as the vehicle is turning a corner. The advantages of this are not only to better illuminate the road surface in the path of movement of the vehicle, but also to reduce headlight glare to other vehicles as the turn is negotiated.

Lastly, many vehicles on the road today have halogen lamps or other lights that are aimed to illuminate the sides of the roads in front of the vehicle during the turn. These other lights are activated by the manual operation of the turn signals of the vehicle. The automatic directional control system 10 of this invention can be responsive to one or more operating conditions of the vehicle to automatically activate these other lights on the vehicle. For example, the automatic directional control system 10 of this invention can be responsive to a steering angle in excess of a predetermined magnitude for automatically activating these other lights on the vehicle. This can be effective to extend the angular range of illumination of the road surface.

Figure 6:
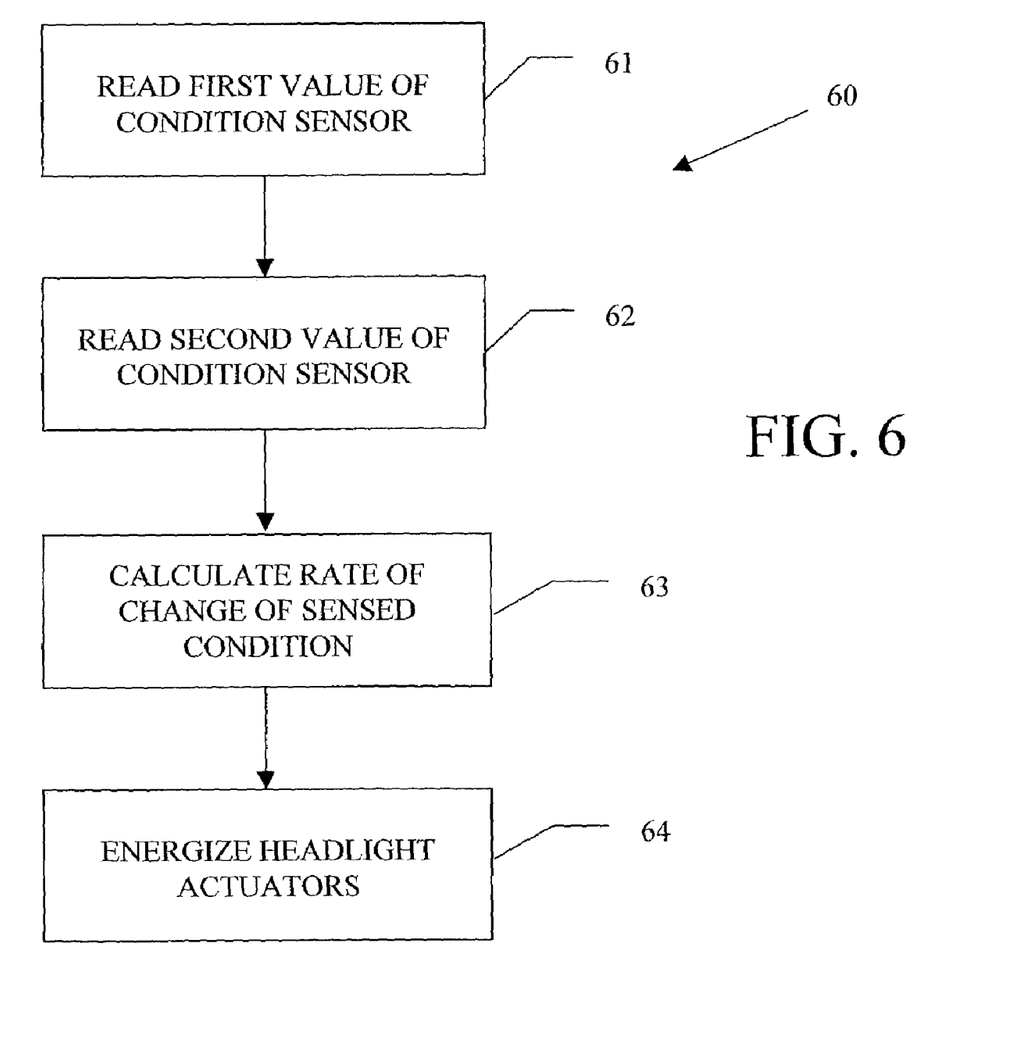
FIG. 6 is a flow chart of an algorithm for operating the headlight directional controller illustrated in FIG. 1 to automatically implement directional angle adjustments in accordance with the rate of change of one or more of the sensed condition values.

FIG. 6 is a flow chart of an algorithm, indicated generally at 60, for operating the headlight directional controller illustrated in FIG. 1 to automatically implement directional angle adjustments in accordance with the rate of change of one or more of the sensed condition values. As mentioned above, the headlight directional controller 14 can be operated to automatically implement directional angle adjustments in accordance with one or more of the sensed condition values or in accordance with the rate of change of one or more of the sensed condition values.

To accomplish this, the algorithm 60 has a first step 61 wherein the values of one or more of the condition sensors 15 and 16 are initially read by the headlight directional controller 14. Then, the algorithm 60 enters a second step 62 wherein the values of one or more of the condition sensors 15 and 16 are subsequently read a second time by the headlight directional controller 14. The second reading of the condition sensors 15 and 16 occurs a predetermined amount of time after the first reading thereof. Next, the algorithm enters a third step 63 wherein a rate of change of the sensed condition or conditions is calculated. The rate of change of the sensed condition can be calculated as the difference between the first and second readings divided by the amount of time therebetween or by any other desired means. For example, if the sensed condition is vehicle speed, then the difference between the first sensed vehicle speed and the second sensed vehicle speed, divided by the amount of time therebetween, would yield a number that is representative of the acceleration of the vehicle. In a final step 64 of the algorithm 60, either or both of the actuators 12 and 13 are actuated to effect movement of the headlight 11 in accordance with the calculated rate of change of the sensed condition. Such movement of the headlight 11 can be effected in a manner that is similar to that described above.

Figure 7:
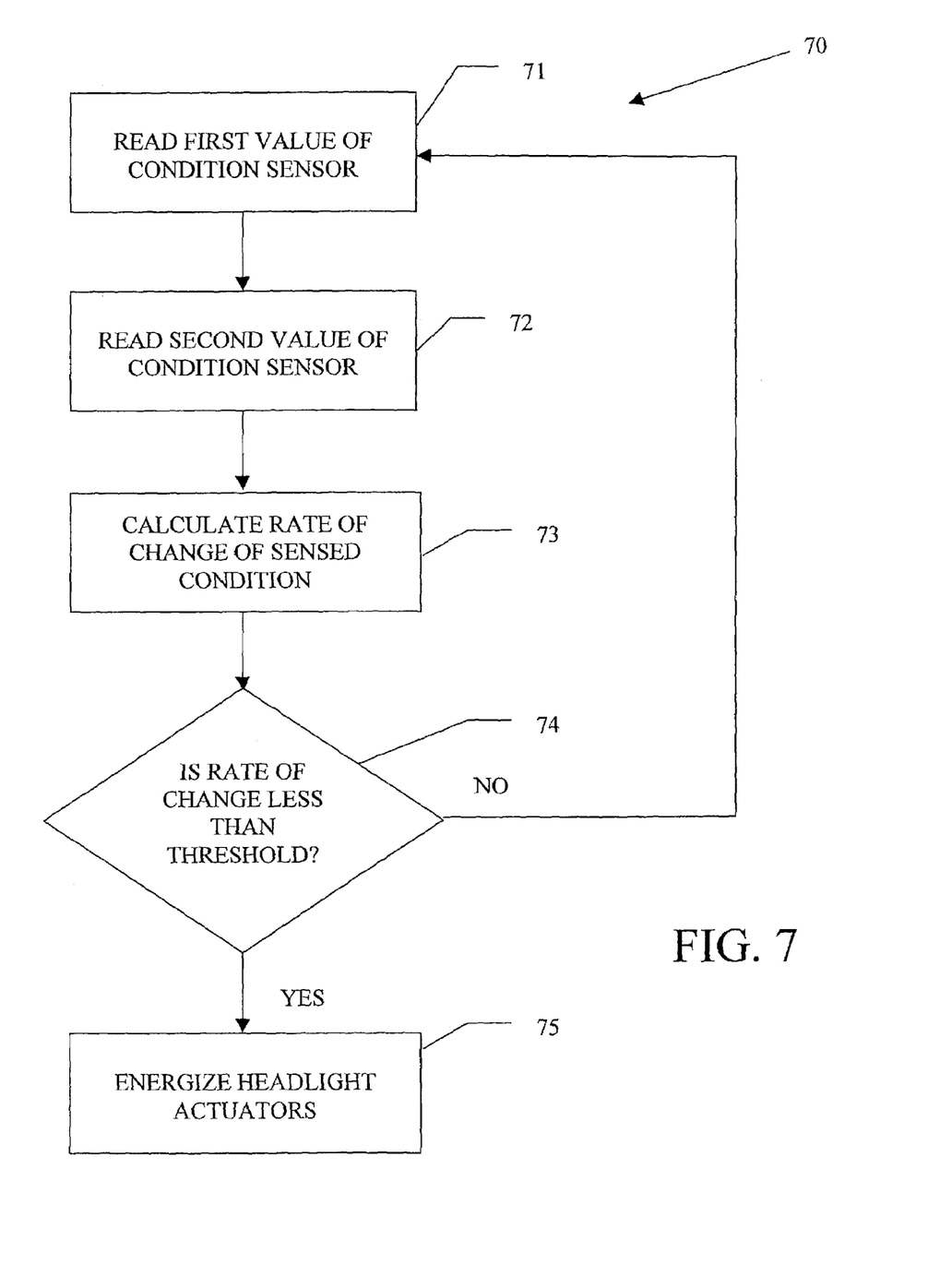
FIG. 7 is a flow chart of an algorithm for operating the headlight directional controller illustrated in FIG. 1 to automatically implement directional angle adjustments, but only when the rate of change of one or more of the sensed condition values is less than (or greater than) a predetermined value.

FIG. 7 is a flow chart of an algorithm, indicated generally at 70, for operating the headlight directional controller illustrated in FIG. 1 to automatically implement directional angle adjustments, but only when the rate of change of one or more of the sensed condition values is less than (or greater than) a predetermined value. As mentioned above, the headlight directional controller 14 can be operated to automatically implement directional angle adjustments in accordance with one or more of the sensed condition values. In this variation of the invention, the headlight directional controller 14 automatically implements directional angle adjustments in response to the sensed condition values (or in response to the rate of change of the sensed condition values), but only when the rate of change of one or more of the sensed condition values is less than (or greater than) a predetermined value.

To accomplish this, the algorithm 70 has a first step 71 wherein the values of one or more of the condition sensors 15 and 16 are initially read by the headlight directional controller 14. Then, the algorithm 70 enters a second step 72 wherein the values of one or more of the condition sensors 15 and 16 are subsequently read a second time by the headlight directional controller 14. The second reading of the condition sensors 15 and 16 occurs a predetermined amount of time after the first reading thereof. Next, the algorithm enters a third step 73 wherein a rate of change of the sensed condition or conditions is calculated. The rate of change of the sensed condition can be calculated as the difference between the first and second readings divided by the amount of time therebetween or by any other desired means. For example, if the sensed condition is suspension height, then the difference between the first sensed suspension height and the second sensed suspension height, divided by the amount of time therebetween, would yield a number that is representative of the rate of change of the suspension height of the vehicle.

In a fourth step 74 of the algorithm 70, a determination is made as to whether the rate of change of the sensed condition value is less than a predetermined threshold value. If the rate of change of the sensed condition value is less than this predetermined threshold value, then the algorithm 70 branches from the decision point 74 to a final step 75 of the algorithm 70, wherein either or both of the actuators 12 and 13 are actuated to effect movement of the headlight 11 in accordance with the calculated rate of change of the sensed condition. Such movement of the headlight 11 can be effected in a manner that is similar to that described above. If, however, the rate of change of the sensed condition value is not less than this predetermined threshold value, then the algorithm 70 branches from the decision point 74 back to the first step 71, wherein the algorithm 70 is repeated. This threshold sensing algorithm 70 can function to prevent the headlight directional controller 14 from being operated to automatically implement directional angle adjustments when the rate of change of the suspension height of the vehicle changes more rapidly than the system can effect corrective changes. For example, if the vehicle is operated on a bumpy road, the algorithm 70 will prevent the headlight directional controller 14 from attempting to correct for every single bump that is encountered. However, for relatively low frequency or rates of change in the suspension height of the vehicle, such as can occur when accelerating, decelerating, and weight changes, the headlight directional controller 14 will be operated in the normal manner to effect corrective actions, as described above.

As mentioned above, the input/output device 17 is connected to (or can be connected to) the headlight directional controller 14 for facilitating communication therewith, and the input/output device 17 can be used for calibrating the automatic directional control system illustrated in FIG. 1 so as to define an initial reference position or positions for the headlight 11 from which the headlight directional controller 14 can implement directional angle adjustments. Additionally, however, the input/output device 17 can be employed as a diagnostic tool. To accomplish this, the input/output device 17 can be embodied as a conventional microprocessor or similar electronically programmable device that can be connected to the headlight directional controller 14 to read fault codes that may be generated during the operation thereof. The headlight directional controller 14 can be programmed to generate fault codes whenever a fault condition or other anomaly occurs or is detected. Such fault codes can be stored in the headlight directional controller 14 until the input/output device 17 is subsequently connected thereto. When so connected, the input/output device 17 can read such codes and display them for an operator. As a result, the operator can take whatever corrective actions are necessary to address the fault condition or anomaly. The input/output device 17 can also be programmed to clear the fault codes from the headlight directional controller 14 after they are read.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An automatic directional control system for a vehicle headlight comprising:
    a sensor that is adapted to generate a signal that is representative of a condition of the vehicle, said sensed condition includes one or more of road speed, steering angle, pitch, and suspension height of the vehicle;
    a controller that is responsive to said sensor signal for generating an output signal only when said sensor signal changes by more than a predetermined minimum threshold amount to prevent said actuator from being operated continuously or unduly frequently in response to relatively small variations in the sensed operating condition; and
    an actuator that is adapted to be connected to the headlight to effect movement thereof in accordance with said output signal.

2. The automatic directional control system defined in claim 1 wherein said sensor generates a signal that is representative of the road speed of the vehicle.

3. The automatic directional control system defined in claim 1 wherein said sensor generates a signal that is representative of the steering angle of the vehicle.

4. The automatic directional control system defined in claim 1 wherein said sensor generates a signal that is representative of the pitch of the vehicle.

5. The automatic directional control system defined in claim 1 wherein said sensor generates a signal that is representative of the suspension height of the vehicle.

* * * * *

INTER PARTES REEXAMINATION CERTIFICATE (624th)
United States Patent
Smith et al.

(10) Number: US 7,241,034 C1
(45) Certificate Issued: Jun. 14, 2013

(54) AUTOMATIC DIRECTIONAL CONTROL SYSTEM FOR VEHICLE HEADLIGHTS

(75) Inventors: James E. Smith, Berkey, OH (US); Anthony B. McDonald, Perrysburg, OH (US)

(73) Assignee: Balther Technologies, LLC, Longview, TX (US)

Reexamination Request:
No. 95/001,621, May 16, 2011
No. 90/011,011, Jul. 10, 2010

Reexamination Certificate for:
Patent No.: 7,241,034
Issued: Jul. 10, 2007
Appl. No.: 10/285,312
Filed: Oct. 31, 2002

Related U.S. Application Data

(60) Provisional application No. 60/369,447, filed on Apr. 2, 2002, provisional application No. 60/356,703, filed on Feb. 13, 2002, provisional application No. 60/335,409, filed on Oct. 31, 2001.

(51) Int. Cl.
*B60Q 1/00* (2006.01)
*B06R 22/00* (2006.01)

(52) U.S. Cl.
USPC .......................................... 362/465; 701/49

(58) Field of Classification Search
None
See application file for complete search history.

(56) References Cited

To view the complete listing of prior art documents cited during the proceedings for Reexamination Control Numbers 95/001,621 and 90/011,011, please refer to the USPTO's public Patent Application Information Retrieval (PAIR) system under the Display References tab.

*Primary Examiner* — My Trang Nu Ton (57) ABSTRACT

A structure and method for operating a directional control system for vehicle headlights that is capable of altering the directional aiming angles of the headlights to account for changes in the operating conditions of the vehicle. One or more operating condition sensors may be provided that generate signals that are representative of a condition of the vehicle, such as road speed, steering angle, pitch, suspension height, rate of change of road speed, rate of change of steering angle, rate of change of pitch, and rate of change of suspension height of the vehicle. A controller is responsive to the sensor signal for generating an output signal. An actuator is adapted to be connected to the headlight to effect movement thereof in accordance with the output signal. The controller can include a table that relates values of sensed operating condition to values of the output signal. The controller is responsive to the sensor signal for looking up the output signal in the table.

**INTER PARTES
REEXAMINATION CERTIFICATE
ISSUED UNDER 35 U.S.C. 316**

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-2 are cancelled.

Claims 3-5 are determined to be patentable as amended.

New claims 6-39 are added and determined to be patentable.

3. [The automatic directional control system defined in claim 1] *An automatic directional control system for a vehicle headlight, comprising:*

*two or more sensors that are each adapted to generate a signal that is representative of at least one of a plurality of sensed conditions of a vehicle such that two or more sensor signals are generated, said sensed conditions including at least a steering angle and a pitch of the vehicle;*

*a controller that is responsive to said two or more sensor signals for generating at least one output signal only when at least one of said two or more sensor signals changes by more than a predetermined minimum threshold amount to prevent at least one first one of two or more actuators from being operated continuously or unduly frequently in response to relatively small variations in at least one of the sensed conditions; and*

*said two or more actuators each being adapted to be connected to the headlight to effect movement thereof in accordance with said at least one output signal;* wherein *at least one of* said [sensor] *two or more sensors* generates [a signal] *at least one of said two or more sensor signals* that is representative of [the] *a rate of change of the* steering angle of the vehicle.

4. The automatic directional control system defined in claim [1] *3*, wherein *at least one of* said [sensor] *two or more sensors* generates a signal that is representative of [the] *a rate of change of the* pitch of the vehicle.

5. The automatic directional control system defined in claim [1] *3*, wherein *at least one of* said [sensor] *two or more sensors* generates a signal that is representative of [the] *a* suspension height of the vehicle.

*6. The automatic directional control system defined in claim 3, wherein said two or more sensors include a first sensor and a second sensor.*

*7. An automatic directional control system for a vehicle headlight, comprising:*

*two or more sensors that are each adapted to generate a signal that is representative of at least one of a plurality of sensed conditions of a vehicle such that two or more sensor signals are generated, said sensed conditions including at least a steering angle and a pitch of the vehicle;*

*a controller that is responsive to said two or more sensor signals for generating at least one output signal only when at least one of said two or more sensor signals changes by more than a predetermined minimum threshold amount to prevent at least one of two or more actuators from being operated continuously or unduly frequently in response to relatively small variations in at least one of the sensed conditions; and*

*said two or more actuators each being adapted to be connected to the vehicle headlight to effect movement thereof in accordance with said at least one output signal;*

*wherein said two or more sensors include a first sensor and a second sensor; and*

*wherein said first sensor is adapted to generate a signal that is representative of a condition including the steering angle of the vehicle and said second sensor is adapted to generate a signal that is representative of a condition including the pitch of the vehicle.*

*8. The automatic directional control system defined in claim 7, wherein said first sensor is physically separate from said second sensor.*

*9. The automatic directional control system defined in claim 7, further comprising one or more additional sensors for sensing one or more of a rate of change of road speed of the vehicle, a rate of change of the steering angle of the vehicle, a rate of change of the pitch of the vehicle, a suspension height of the vehicle, or a rate of change of suspension height of the vehicle.*

*10. The automatic directional control system defined in claim 9, wherein at least one of said one or more additional sensors generate a signal that is representative of the rate of change of the road speed of the vehicle.*

*11. The automatic directional control system defined in claim 9, wherein at least one of said one or more additional sensors generate a signal that is representative of the rate of change of the steering angle of the vehicle.*

*12. The automatic directional control system defined in claim 9, wherein at least one of said one or more additional sensors generate a signal that is representative of the rate of change of the pitch of the vehicle.*

*13. The automatic directional control system defined in claim 9, wherein at least one of said one or more additional sensors generate a signal that is representative of the suspension height of the vehicle.*

*14. The automatic directional control system defined in claim 7, wherein the automatic directional control system is configured such that said two or more actuators include a first actuator and a second actuator and wherein the first actuator connected to the headlight to effect movement thereof in a first direction and the second actuator connected to the headlight to effect movement thereof in a second direction different from the first direction.*

*15. The automatic directional control system defined in claim 7, wherein the two or more actuators include a first actuator that is adapted to be connected to the headlight to effect movement thereof in a vertical direction.*

*16. The automatic directional control system defined in claim 15, wherein the two or more actuators include a second actuator that is adapted to be connected to the headlight to effect movement thereof in a horizontal direction.*

*17. The automatic directional control system defined in claim 7, wherein the two or more actuators include an electronically controlled mechanical actuator.*

*18. The automatic directional control system defined in claim 7, wherein the two or more actuators include a step motor.*

*19. The automatic directional control system defined in claim 7, wherein the two or more actuators include a servo motor.*

20. The automatic directional control system defined in claim 7, wherein the two or more actuators include a microstepping motor capable of being operated in fractional step increments.

21. The automatic directional control system defined in claim 7, wherein the automatic directional control system is configured such that the headlight is adjustably mounted on the vehicle such that a directional orientation at which a beam of light projects therefrom is capable of being adjusted both up and down relative to a horizontal reference position and left and right relative to a vertical reference position.

22. The automatic directional control system defined in claim 7, wherein the automatic directional control system is configured such that, while in a calibration mode, a directional orientation at which a beam of light projects is capable of being adjusted relative to the vehicle by manual operation of the two or more actuators.

23. The automatic directional control system defined in claim 7, wherein the automatic directional control system is configured such that the controller includes a microprocessor.

24. The automatic directional control system defined in claim 7, wherein the automatic directional control system is configured such that the controller includes a programmable electronic controller.

25. The automatic directional control system defined in claim 7, wherein the automatic directional control system further includes at least one position feedback sensor capable of providing a position feedback signal associated with at least one of the two or more actuators.

26. The automatic directional control system defined in claim 25, wherein the at least one position feedback sensor includes a Hall Effect sensor.

27. The automatic directional control system defined in claim 25, wherein the at least one position feedback sensor includes an optical interrupter.

28. The automatic directional control system defined in claim 7, wherein the automatic directional control system further includes memory.

29. The automatic directional control system defined in claim 28, wherein the memory includes non-volatile memory.

30. The automatic directional control system defined in claim 28, wherein the memory is configured to store a predetermined reference position associated with the headlight.

31. The automatic directional control system defined in claim 7, wherein the automatic directional control system is configured such that the pitch of the vehicle is capable of being determined by sensing a front and a rear suspension height of the vehicle.

32. The automatic directional control system defined in claim 7, wherein the automatic directional control system is configured such that the pitch of the vehicle is capable of being determined by a pitch sensor.

33. The automatic directional control system defined in claim 7, wherein the automatic directional control system is configured such that the controller is programmed to be responsive to changes in a suspension height of the vehicle that occur at frequencies lower than a suspension rebound frequency of the vehicle.

34. The automatic directional control system defined in claim 7, wherein the automatic directional control system is configured such that the controller is programmed to be responsive to changes in a suspension height of the vehicle that occur at frequencies lower than a suspension rebound frequency of the vehicle, thereby ignoring frequency changes in the suspension height of the vehicle that are a result of bumps in a road.

35. The automatic directional control system defined in claim 7, wherein the automatic directional control system is configured such that the predetermined minimum threshold amount functions as a filter to minimize undesirable operation of at least one of the two or more actuators.

36. The automatic directional control system defined in claim 7, wherein said controller is further responsive to at least one of said two or more sensor signals to automatically activate one or more vehicle lights that are different than the headlight.

37. The automatic directional control system defined in claim 36, wherein said one or more vehicle lights that are different than the headlight include one or more lights for illuminating a road in front of the vehicle during a turn.

38. The automatic directional control system defined in claim 7, wherein said controller is further responsive to a steering angle in excess of a predetermined magnitude for automatically activating one or more vehicle lights that are different than the headlight.

39. The automatic directional control system defined in claim 7, wherein said controller is further responsive to a steering angle in excess of a predetermined magnitude for automatically activating one or more vehicle lights that are different than the headlight to extend an angular range of a road surface.

* * * * *